Jan. 5, 1971 N. B. EGGERT 3,551,948
ADJUSTABLE CORE PIN MECHANISM
Filed Dec. 23, 1968 2 Sheets-Sheet 1

INVENTOR.
NOEL B. EGGERT
BY D. R. Birchall
E. J. Holler
ATTORNEYS

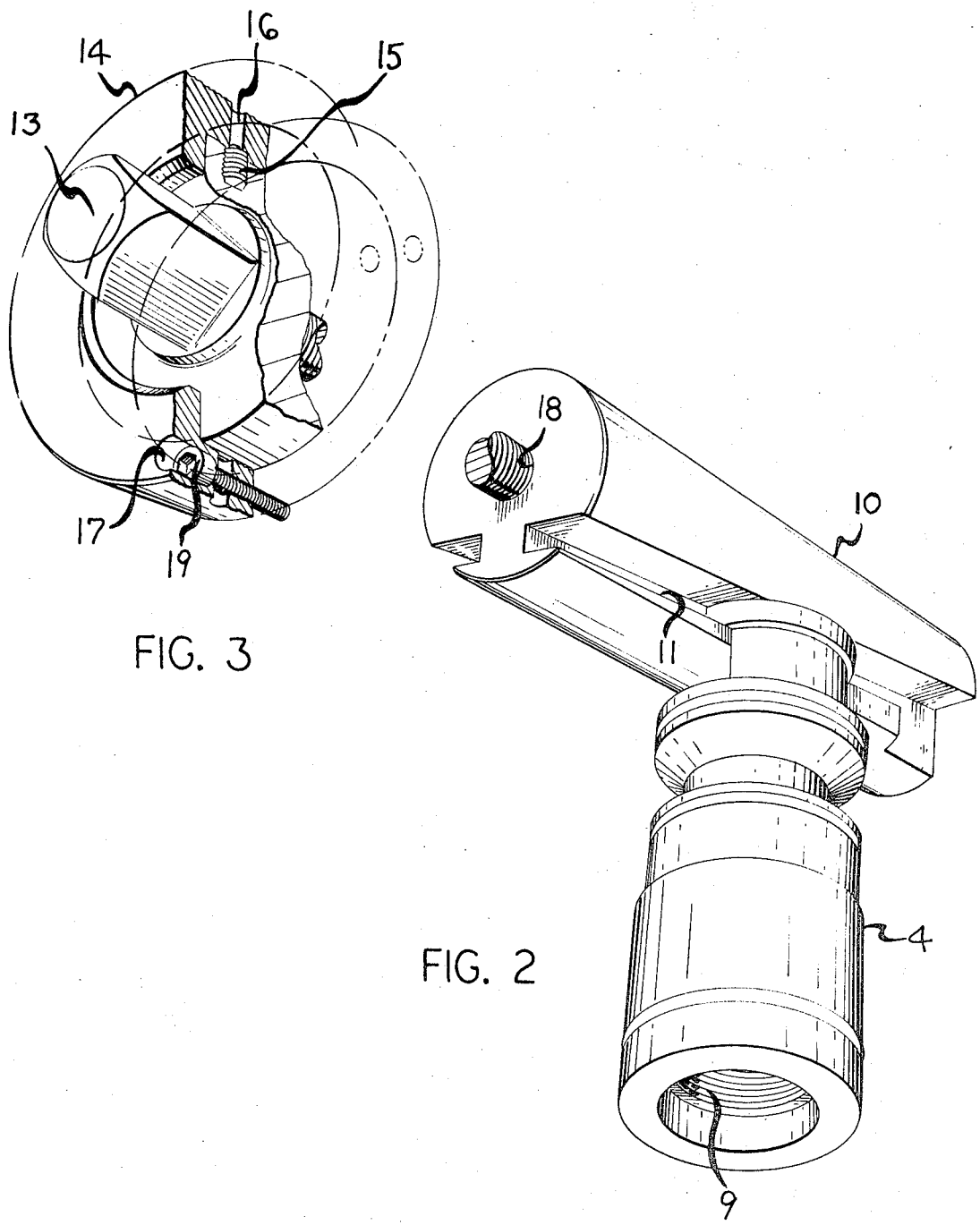

United States Patent Office 3,551,948
Patented Jan. 5, 1971

3,551,948
ADJUSTABLE CORE PIN MECHANISM
Noel B. Eggert, Toledo, Ohio, assignor to Owens-Illinois, Inc., a corporation of Ohio
Filed Dec. 23, 1968, Ser. No. 786,038
Int. Cl. B29c 1/06
U.S. Cl. 18—5
9 Claims

ABSTRACT OF THE DISCLOSURE

Mechanism to adjust the length of a core pin a known distance in an injected finish-blow molding machine without disassembling the neck ring mold. The mechanism consists of a cylindrical cam moveable at right angles to the longitudinal axis of the core pin. A low angle track on the cam provides the means for transferring the inward or outward movement of the cam to the upward or downward movement of the core pin.

---

This invention relates to an adjustment mechanism on a blow molding machine and more particularly to a camming mechanism for adjusting the length of a core pin in an injected finish-blow molding machine thereby permitting the utilization of one core pin with any one of a plurality of neck ring molds of different lengths.

In an injected finish-blow mold machine, plastic material is injected into the neck ring cavity which surrounds the core pin through an extruder nozzle which is relatively positioned below the core pin.

When the end of the extruder nozzle contacts the base of the neck ring mold, the base of the core pin should extend to a point such that it contacts the end of the mandrel rod in the extruder nozzle and is flush with the base of the neck ring mold. The end of the mandrel rod within the extruder nozzle should also be flush with the end of the nozzle. If the base of the core pin does not extend as far as the base of the neck ring mold, a thin film of plastic is formed between the end of the mandrel rod and the base of the core pin when the end of the extruder nozzle is brought into contact with the base of the neck ring mold and plastic is injected into the neck ring cavity. If the base of the core pin extends beyond the base of the neck ring mold, a thin film of plastic is formed between the base of the neck ring mold and the end of the extruder nozzle when the base of the core pin is brought into contact with the end of the mandrel rod. Thus, it can be seen from the description that when the core pin, neck rings and extruder nozzle are properly aligned, the end of the extruder nozzle and the end of the mandrel rod will form one plane which is parallel to the plane formed by the base of the neck ring mold and the base of the core pin. However, if this alignment is not accomplished in the above-described manner, it would be necessary to adjust the core pin relative to the base of the core pin.

Heretofore, the change in position of the core pin was brought about by the placement of shims in the interface between the core pin and the core pin adapter. Consequently, in order to install these shims, it was necessary to disassemble the neck ring mold and unscrew the core pin from the adapter while the support block was relatively hot.

It is therefore a primary object of the present invention to provide a camming mechanism to externally adjust the length of the core pin without disassembling the neck ring mold.

Another object of the present invention is to provide a camming mechanism to externally adjust the length of a core pin thereby permitting the utilization of one core pin with any member of a plurality of neck ring molds of different lengths.

A further object of the invention is to provide a camming mechanism to externally adjust the length of a core pin a known distance.

An object of the invention is to provide an adjustment mechanism which will withstand the large relatively upward force exerted upon the core pin by the mandrel rod and transmitted to the camming mechanism through the core pin and the adapter.

With these and other objects in mind, the present invention contemplates a cylindrical cam with a cam track disposed at a low angle with respect to the longitudinal axis of the cam. This cam is attached to a core pin adapter and a core pin and is moveable at right angles to the longitudinal axis of the core pin and the adapter. The cam is moved inward or outward in response to rotation of a fine pitch adjusting screw positioned on the outside of the support block and threaded into the cam. The track on the cam is placed on an angle such that as the cam is moved outward, the core pin and the adapter move upward. Thus the core pin can be adjusted by rotating the easily accessible adjusting screw positioned outside the support block without disassembling the neck ring molds. It is also contemplated by this invention a cam with a cam track disposed at a low angle such that the core pin and adapter move upward as the cam is moved inward.

The above briefly described adjustable core pin mechanism will become more readily apparent to those skilled in the art from the embodiments thereof shown in the accompanying drawings and from the subsequent written description.

In the drawings:

FIG. 2 is an illustrative perspective view of a moveable cam and a core pin adapter.

FIG. 3 is an illustrative perspective view of an adjusting screw and a retainer for the same.

As shown in the drawings:

Figure 1:
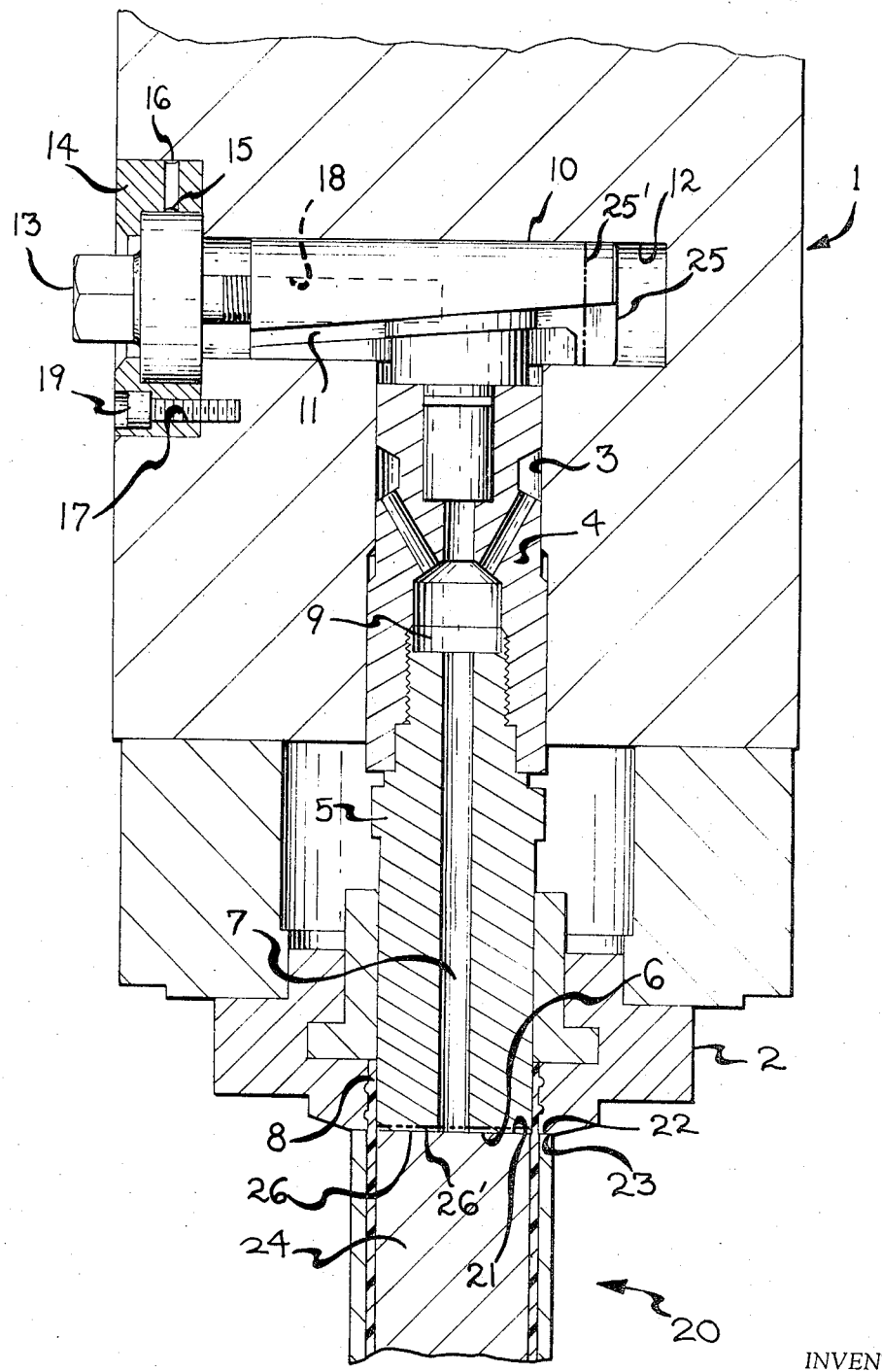
FIG. 1 is a vertical sectional view of a support block for an injected finish-blow molding machine and an adjustable core pin mechanism for the same.

FIG. 1 reference numeral 1 refers generally to a support block for an injected finish-blow molding machine having a cylindrical bore 3 which guides a core pin adapter 4 longitudinally with respect to the end face of the support block 1. One end of the core pin adapter is internally threaded and attached to adjustable core pin 5 by screwing the threaded end of the core pin into matching threads 9 of the adapter. This adjustable core pin 5 with central air passage 7 extends axially into a neck ring mold 2 thereby permitting the blow molding of plastic material which has been injected relatively upward into neck ring cavity 8 through extruder nozzle 20.

As illustrated in FIGS. 1 and 2, the other end of core pin adapter 4 is slidably mounted on cam 10 upon a cam track 11 which is disposed at a low angle with respect to the longtitudinal axis of said cam. This cam is moveable within cylindrical bore 12 at right angles to the longitudinal axis of adapter 4 and adjustable core pin 5. When cam 10 is moved inward from line 25' to line 25 in response to rotation of adjusting screw 13, the core pin moves downward from line 26' to line 26. Thus, the core pin 5 can be adjusted to align with base 22 of neck ring mold 2.

Adjusting screw 13 shown in FIG. 3 is threaded at one end and threaded into recess 18 of cam 10. Adjusting screw retainer 14 which is attached to support block 1 by means of three cap screws 19, which in turn is located within cylinder bore 17 of screw retainer 14, positions adjusting screw 13 within support block 1 allowing the adjusting screw to be turned and yet restricting any end play of the adjusting screw within the retainer. Mounted within the flange of adjusting screw 13 is a ball plunger 15 which registers into any one of four cylindrical detents 16 equally spaced at 90° apart in the screw retainer 14. In the preferred embodiment of this mechanism, each one-quarter turn of adjusting screw 13 positions ball plunger 15 into a new detent thereby moving cam 10 inward or outward at right angles to the longitudinal axis of adapter 4 and core pin 5 a known distance of 0.0125 inch and causing said adapter and core pin to be moved upward or downward a known distance of 0.001 inch. Therefore, when end 23 of extruder nozzle 20 is brought into contact with base 22 of neck ring mold 2, the end 6 of core pin 5 can be adjusted so that it is flush with the base 22 of the neck ring mold and also contacts end 21 of mandrel rod 24. After adjustment, the plane formed by the end 23 of the extruder nozzle 20 and the end 21 of the mandrel rod 24 would be parallel to the plane formed by the base 6 of the core pin 5 and the base 22 of the neck ring mold 2.

The invention thus provides a mechanism by which a core pin can be quickly adjusted in length without disassembling the neck molds, thereby permitting its utilization with any one of a plurality of neck ring molds of different lengths.

What is claimed is:

1. In an injected finish blow molding machine, a mechanism to adjust a core pin with respect to the neck ring molds of the molding machine, said mechanism comprising in combination a cylindrical cam horizontally disposed with respect to the support block of said blow molding machine, an adjusting screw connected to said cam which moves the cam horizontally with respect to the support block, an adjusting screw retainer attached to said adjusting screw which restricts the end play of the adjusting screw, a core pin adapter which connects said core pin to said cam, and a core pin which moves longitudinally with respect to the support block surrounding said core pin.

2. The combination as claimed in claim 1 wherein said mechanism includes means to move said cylindrical cam at right angles to the longitudinal axis of the core pin in response to the rotation of said adjusting screw.

3. The combination as claimed in claim 1 including an adjusting screw, a portion of which is located on the outside of the support block for easy access and including means to cause the core pin to slide upward or downward with respect to the longitudinal axis of the support block a known distance in response to rotation of said adjusting screw.

4. In an injected finish blow molding machine, a mechanism to adjust the length of a core pin, said mechanism comprising in combination a cylindrical cam which is moveable at right angles to the longitudinal axis of the core pin, means positioned on said cylindrical cam to transfer the relatively inward or outward motion of the cam to the relatively upward or downward movement of the core pin, an adjusting screw connected to said cam, a portion of which is located on the outside of the support block for easy access, which moves the cam inward or outward with respect to the longitudinal axis of the support block a known distance in response to the rotation of said screw, an adjusting screw retainer enveloping said adjusting screw restricting end play in said adjusting screw, a core pin adapter which connects the core pin to the cam, and a core pin which moves longitudinally with respect to the support block surrounding said core pin.

5. A mechanism as claimed in claim 4 wherein the means for transmitting the relatively inward or outward movement of the cylindrical cam to the relative upward or downward movement of the core pin includes a cam track disposed at a low angle to the longitudinal axis of the cam.

6. A mechanism as claimed in claim 4 wherein an easily accessible adjusting screw is attached to a moveable cam causing the core pin to slide relatively upward or downward a known distance in response to each one-quarter turn of said adjusting screw.

7. An adjusting screw as claimed in claim 6 including a ball plunger positioned within its flange allowing said screw to be rotated a known arc distance.

8. A mechanism as claimed in claim 4 wherein the adjusting screw retainer includes four detents equally spaced at 90° apart and is attached to the support block thereby restricting the end play of said adjusting screw within the retainer.

9. A mechanism as claimed in claim 4 wherein a core pin adapter is slideably mounted to the track of the cylindrical cam and is attached at the other end to the core pin.

References Cited

UNITED STATES PATENTS

| | | | |
|---|---|---|---|
| 3,115,682 | 12/1963 | Soubier | 18—5BZ |
| 3,375,552 | 4/1968 | Beck | 18—5 |

RICHARD J. HERBST, Primary Examiner